United States Patent
Tully et al.

[11] 3,710,510
[45] Jan. 16, 1973

[54] PLANT GROWTH MEDIA AND METHODS

[75] Inventors: Paul R. Tully, Lowell; Robert J. Lippe, Methuen, both of Mass.

[73] Assignee: Cabot Corporation, Boston, Mass.

[22] Filed: May 10, 1971

[21] Appl. No.: 141,774

[52] U.S. Cl. .......................... 47/58, 252/316, 71/64
[51] Int. Cl. ................................................ A01g 9/00
[58] Field of Search ....47/58, 37, 1, DIG. 9, DIG. 10; 252/316; 71/64

[56] References Cited

UNITED STATES PATENTS 3,082,074  3/1963  Handley et al .....................47/DIG. 4
3,158,462  11/1964  Wilson..............................47/DIG. 4

*Primary Examiner*—Robert E. Bagwill
*Attorney*—Kenneth W. Brown

[57] ABSTRACT

Methods of germinating seeds and growing easily transplantable seedlings are disclosed based upon the use of loose pulverulent bed materials the basic ingredient of which consists of a relatively stable form of finely dispersed aqueous liquid the individual droplets of which are enveloped and held within a coating network of smaller, strongly hydrophobic colloidal oxide particles. Methods of producing the basic ingredient are also disclosed as well as preferred proportions of various components and optimized pulverulent bed mixtures.

14 Claims, 1 Drawing Figure

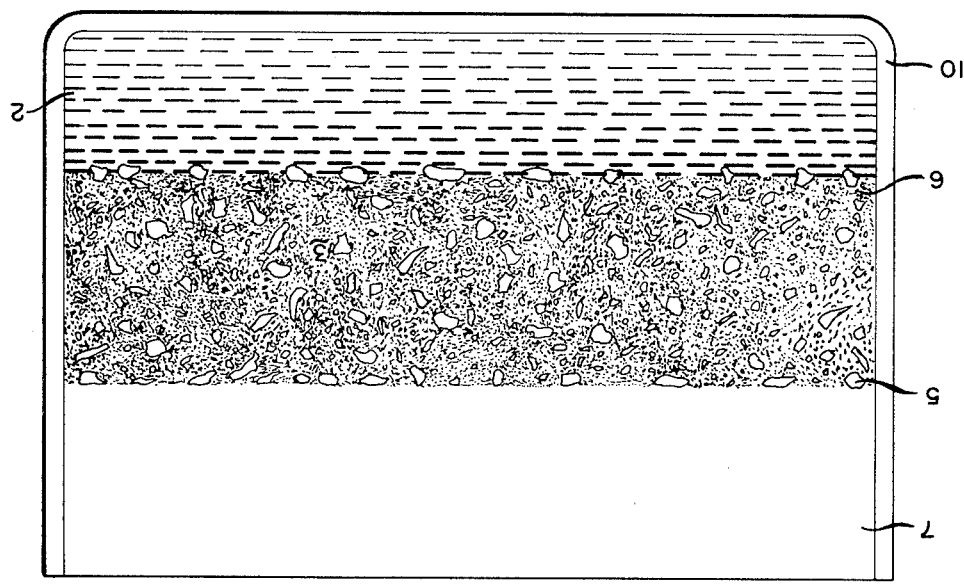

PLANT GROWTH MEDIA AND METHODS

This invention is concerned with various steps in plant culture, such as seed germination, the development of seedlings into young plants and the growth of plants especially adapted for transplanting, and with bed media for use in such horticultural procedures. The methods and bed media provided herein are particularly helpful in meeting the extra challenge involved in germinating very fine seeds, developing tender seedlings and raising inherently delicate plant species through their most difficult stages of life.

Over the years considerable effort has been expended toward developing improved methods of handling treating, storing, preconditioning and packaging seeds in order to protect, preserve or enhance the viability of same and increase the chances of success in producing healthy plants therefrom. Notable refinements in this field include such convenient techniques as the use of controlled moisture absorbent papers or other synthetic or modified natural media in germination testing and the "preplanting" of seeds either in packaged media requiring only the addition of water for "starting" same or in neat strips or tapes, etcetera, which can be placed directly in the soil or other plant-growth medium more quickly and precisely.

As a result of such research efforts and refined practices, present-day farmers and gardeners can generally count on a fairly high efficiency of seed germination and sprouting, given the presence of moisture and favorable temperatures. However, with many of the more prized and valuable plant species, germination and early growth rates are very slow and the young seedlings are very delicate. Therefore, they are usually started indoors or in protected frames, heated beds or the like. In greenhouse horticulture and other such controlled environment gardening, it has become quite common to use carefully selected "soils" or especially fabricated or modified planting media. For example, a particular type of sand, loam, peat or moss might be used alone or in mixtures. Especially favored for their freedom from weed seeds, fungi or plant disease contaminants are starter beds based upon such modified natural materials as matted cellulosic fibers, exfoliated vermiculite or expanded (or popped) perlite. Presumably, because of their porous structure and low bulk density, these materials provide a desirable combination of good drainage for excess liquid together with a reasonable capacity for moisture absorption and retention. However, the majority of amateur gardeners still tend to be overzealous in watering starter beds so that seeds may actually rot and/or many young seedlings will die from "damping off" or "drowned" root systems. Indeed, even with the best care and regularly controlled conditions, it is still a very major horticultural problem to develop healthy plants to a size suitable for transplanting as well as to actually transplant same without serious damage to the root system and resulting setback in the growth rate for a time thereafter.

Accordingly, it is a primary object of the present invention to provide improved bed media for germinating seeds and growing plant seedlings. Another major objective is to provide such bed media which simultaneously possess both ample moisture retention capacity and a high degree of freeness or air permeability. A further similar object is to achieve an ideal bed structure which resists compaction and blinding when excessively watered and tends instead to remain open and free draining so as to protect against drowning or smothering of seeds, sprouts and/or root systems.

Additional objects include methods of making such bed media and mixtures and the provision of special bed structures based thereon, as well as horticultural methods for using same. A special object is to provide methods of growing transplantable seedlings which promote extensive development of healthy root systems while simultaneously minimizing restrictions on movement of said root systems so that they can be kept intact and without serious damage during the actual transplanting step. Other objects and advantages of our invention will become more evident from the following detailed description thereof.

In accordance with the present invention, the above objects and advantages are accomplished by carrying out the seed germination and/or seedling development while the seed or root system (as the case may be) is encompassed within a fluffy, uncompacted bed containing moisture stably dispersed through same largely in the form of small liquid droplets. The basic key to the bed structure is the physical arrangement of dispersed liquid droplets which is stably achieved by enveloping most of same within a thin network or coating of colloidal solid particles of metallic oxide having on the surface thereof, in amount sufficient to render same hydrophobic, organosilicon groups conforming to the general formula:

$$-\text{Si} R_a X_b$$

where Si is silicon, each R is any alkyl, aryl, alkaryl, alkoxy, aryloxy, alkarlyoxy or aralkoxy radical; $a$ is an integer from 2 to 3; each X is a halogen or hydroxyl radical; $b$ is an integer from 0 to 1; and the sum of $a+b$ is 3. In the most preferred groups, $a$ is 3 and "X" radicals are not present. The ability of ultra-fine pyrogenic silicas having strongly hydrophobic surfaces to form a barrier layer around droplets of water and thereby hold several times as much water by weight in the form of finely dispersed droplets surrounded and separated from each other by a coating of the fine solid particles of silica has been described in U.S. Pat. No. 3,393,155. The finely dispersed liquid water in dry colloidal hydrophobic silica described in said patent is sufficiently stable for use as the dispersed moisture in the horticultural bed media of the present invention. However, in many plant culture applications of the present invention it is preferred that a fraction of a percent by weight of plant nutrients be dissolved or mixed into the water before it is agitated with the hydrophobic colloidal solids to form the droplets of moisture stably dispersed within the network of fine solid particulates. For example, any of the well-known liquid or soluble fertilizers may be used for this purpose whether derived from fish residues or other well-balanced mixture of the major plant nutrients together with necessary or desired trace minerals.

In preparing the dispersion of aqueous liquid in fine solid particulates for use in the present invention we have discovered that, in addition to or in place of the hydrophobic pyrogenic silicas used in U.S. Pat. No. 3,393,155 other strongly hydrophobic metallic oxides having an average equivalent spherical diameter of less than about 100 millimicrons can also be used. For example, other finely divided oxides such as aluminas, titanias, zirconias, vanadium oxides, iron oxides or mixed oxides with or without silica can form the basic oxide particles whether produced pyrogenically or otherwise, e.g., by wet precipitation techniques. Also, wet precipitated silicas such as those produced by acidification or neutralization of aqueous alkali metal silicate solutions make ideal starting materials when available in particulate form of the desired fineness. For example, U.S. Pat. Nos. 2,865,777; 2,900,348; 2,913,419; 2,995,422; 3,010,791; 3,034,913; 3,172,726 and 3,250,594 describe a few of the many different techniques for precipitating particulate silicas from aqueous medium in a form which is sufficiently non-sticky and non-gelatinous to be washed, filtered, dried and subdivided to colloidal powder form.

U.S. Pat. No. 3,393,155 indicates that a typical pyrogenic silica having a BET surface area of about 150 square meters per gram and which has been treated so as to attach hydrophobic organo groups in concentrations of at least about 0.2 millimoles per 100 square meters of surface will easily incorporate and hold in dispersed droplet form about 5 to 10 times its weight of aqueous liquid without appreciable change in its fluffy dry appearance or substantial reduction of its bulk. The maximum proportion of aqueous liquid which can be held in stably dispersed form by the particulate solid will depend largely on the amount of exposed surface provided per unit weight of said solid provided, of course, that it is sufficiently well covered with organo groups to provide thorough hydrophobicity.

To insure good performance in the present invention, the finely divided metallic oxide material should possess a BET surface area of at least about 50 square meters per gram, and preferably at least 100 square meters per gram. The art of treating such metallic oxides, particularly colloidal silicas, with organo compounds reactive with hydroxyl groups (or silanol groups, etcetera) on the surface of the oxides, to render same hydrophobic is by now well developed. For example, reference is made to such patent literature as U.S. Pat. No. 2,510,661; 2,589,705; 2,705,206; 2,705,222 and 3,023,181. Accordingly, suffice it to say, that the surfaces of the particulate metallic oxide can readily be reacted at moderate temperatures and/or pressures with various organo compounds, particularly organosilicon compounds such as organohalosilanes and the like so as to cover said surfaces with hydrophobic components, the preferred active groups in which probably conform to the generic formula, $$-Si-R_a X_b,$$

as defined previously herein. Said active hydrophobic groups are usually attached to the solid oxide surface by regular covalent type bonds, normally from the silicon atom to an oxygen atom on the surface of the solid particle. However, in some cases a form of hydrogen bonding may be involved, e.g., between a hydrogen atom attached to the silicon atom and hydroxyl groups or the like on the surface of the solid particles.

Specific examples of organosilicon compounds which are often reacted with colloidal metallic oxides to form surface structures like those described above are: organohalosilanes such as $(CH_3)_3 SiCl_2$, $(CH_3)_2Si Br_2$, $(CH_3)_2 SiCl_2$ and $(C_4H_9)_3 SiCl$; organosilylamines such as $(CH_3O)_3 Si(CH_2)_3 NH(CH_2)_2$ and $(CH_3O)_2 (CH_3) SiCH_2 CH(CH_3)-CH_2NHCH_2CH_2NH_2$; organodisilazanes such as $(CH_3)_3 SiNHSi(CH_3)_3$ and $(C_4H_9)_3SiNHSi(C_4H_9)_3$, etcetera. In most cases, the surface treatments must be sufficient to attach organo groups totaling at least 0.5 percent and preferably at least 1 percent by weight based on the dry weight of the metallic oxide particles treated. In many cases, especially with the most preferred high surface area oxides, the concentration of organo groups thereon will equal 2 percent or more by weight.

It can be seen now that the above-described finely dispersed form of aqueous liquid in which individual droplets thereof are surrounded by a coating or network of very fine, hydrophobic particles of metallic oxide comprises the basic ingredient in the fluffy, uncompacted bed systems used in accordance with the present invention for germinating seeds and/or nurturing developing roots of growing plants. This basic ingredient can be prepared by almost any form of mechanical agitation or shearing action which will disperse or break up said liquid into fine droplets while in intimate contact with said hydrophobic solid particles. For example, the desired dispersion and combination can be brought about as indicated in U.S. Pat. No. 3,393,155 by merely shaking vigorously a closed container partially filled with the desired liquid and fine hydrophobic solid particles. However, we have found that the desired dispersion of aqueous liquid droplets enveloped by the thin coating of fine solids can be achieved much more quickly if the liquid in the presence of said solid particles is more intensely sheared apart and/or rapidly atomized into fine droplets. For example, no more than a few minutes is required to accomplish the desired dispersion and combination of liquid in solid particles in a Waring Blendor or other high-speed rotary agitating device, such as the Cowles Dissolver or Dispersator. Best results in terms of obtaining a uniform combination of homogeneous dispersion of liquid droplets coated by said solid particles quickly and easily will usually be achieved by not completely filling the container in which the agitator is running and by running the agitator intermittently and terminating the process completely within a few seconds after all of the liquid seems to dissappear. Of course, such control of the agitation timing can more readily be observed if the lower portion of the container is transparent.

When the amount of aqueous liquid incorporated into the fine hydrophobic oxide material is limited within the amounts which can be stably dispersed as fine droplets coated by the network of fine solid particles while retaining virtually the powdery appearance and flow behavior of the original dry powdery oxide particles, the resulting homogeneous dispersion of liquid in solid particles will generally contain from about 5 to about 15 parts of liquid by weight per part of solid oxide material (over the most useful specific BET surface area range of from about 50 to about 250 square meters per gram). We have found that bed media composed entirely of this basic ingredient, i.e., the homogeneous dispersions of moisture in solid particles, can be used per se to effect efficient germination of seeds submerged therein. Furthermore, especially when plant nutrients have been included in the aqueous liquid used in preparing same, said basic ingredient alone will sustain growth of young seedlings and, in fact, seems to provide maximum opportunity for development of root systems.

However, for most horticultural operations, we prefer to use bed media containing a mixture of the above-described basic ingredient, i.e., dispersions of aqueous liquid enclosed within fine hydrophobic solid particles, with additional ingredients. The most common such added ingredients comprise various mineral solids, such as sand, vermiculite, perlite and clays, and additional water or aqueous liquids in various forms. The preferred extender solids are relatively coarse in particle size and have relatively low bulk densities, such as exfoliated vermiculite, popped perlite and various expanded clays, since these possess high water absorptive capacities and can comprise a major portion of the bed media without excessively raising the overall bulk density of the bed or imparting a tight compacted structure thereto such as would unduly restrict rootlet growth and development. These materials can be used in almost any of the commercial grades in which they are normally available. Generally, a variety of particle size ranges may be represented, e.g., from about 325 mesh up to as much as ¼ inch or even larger, with bulk densities ranging between about 4 and about 40 pounds per cubic foot.

Bed media having the best balance of properties for most purposes will generally result from mixtures of the above type wherein the proportions of the other solids mixed with said basic ingredient (i.e. the dispersed aqueous liquid in a particulate hydrophobic solids network) is adjusted so that the bulk volume of the latter is between about ½ and 2 times that of the former. Since the basic ingredient may vary in bulk density between about 10 and about 30 pounds per cubic foot (depending largely on the water content thereof), this means that, on a weight basis, most of the preferred mixtures will fall in a range from about 5:1 to 1:5. Although the bulk densities of some includable solids like sand, loam and unexpanded clays can often be as high as 90 – 100 pounds per cubic foot, the weight ratio of the basic ingredient to the dry weight of solids added separately thereto will still rarely fall substantially below about 1:6 because the maximum amount of such relatively dense solids should be restricted to avoid producing a composite media bed which is sufficiently compact and heavy to stifle or seriously restrict developing root systems. In other words, such relatively dense solids should never account for more than a minor fraction of the total bulk volume.

It should also be pointed out that various organic solids having a light fluffy character, such as chopped peat or sphagnum mosses, granular charcoal and various cellulosic flocs or other fibrous agglomerates, can be substituted in whole or in part for the mineral solids described above in the bed media of this invention.

As indicated earlier, the incorporation of additional forms of water or aqueous liquid in the bed media of this invention is also contemplated and indeed, is not only feasible but usually is also desirable. For example, whenever separate mineral or organic extender solids are included, it is advisable to incorporate additional aqueous liquid in amounts corresponding substantially with the capacity of said extender solids to absorb or imbibe same. Also, with some plant species, seed germination and plant growth can be accelerated by including extra droplets of water or other aqueous liquid distributed through the interstices of the bed media but not completely coated by a separate layer of solid oxide particles. We have found that the bed media of the present invention is capable of retaining a significant quantity of such extra droplets of incompletely encased water without destroying its light, fluffy structure and porosity to gases and liquids (although the bed does lose some of the original dry powdery character). The ability of our bed media to hold such extra, incompletely encased water droplets is apparently due to the fact that the outer portion of the solid particle layer which surrounds the originally dispersed and completely encased liquid droplets is also strongly hydrophobic. As a result, if a limited amount of additional water (e.g. up to about 50 percent of the maximum which could originally be completely enclosed within the oxide particles without changing their outward appearance appreciably) is quickly introduced thereto in dispersed form (e.g. by a high-speed shearing action or agitation), then these free droplets are physically held apart by the original, solid particle-coated droplets. The combination of liquid surface tension and the bulk of the hydrophobic-surfaced droplets thus enables these extra droplets to "survive" or remain trapped in the interstices of the bed for some time. When such extra or excess water droplets are present in the basic ingredient of this invention, and other solids to be incorporated with same in forming the finished bed media, should be essentially saturated with moisture before being added thereto so as to prevent extensive absorption of such extra droplets by said added solids.

Excess or reserve moisture can also be provided in bed structures of the present invention in the form of a pool of aqueous liquid at the bottom of a container in which the previously described fluffy bed media are held. Thus, as long as the basic ingredient described hereinabove is used in proportions having a bulk volume not less than half that of the other solids mixed therewith, the resulting composite bed media retains sufficient air occluded therein to insure that the composite bed will float on such a layer of water. Thus, the strongly hydrophobic nature of the exposed surfaces of said basic ingredient evidently prevents aqueous liquids from being drawn up into the bed from the pool below by the wellknown capillary or wicking action exhibited by soils or other special porous bed media used for plant starter beds. At the same time, water vapor can diffuse from said lower liquid layer into the interstices of the bed media via this same network of occluded air held by the hydrophobic metallic oxide material thereby providing make-up moisture to compensate for losses from the bed media, e.g. by transpiration through the growing plant life, evaporation into the surrounding air, etcetera.

In order to illustrate more clearly the gross physical structure of such a composite bed, reference is made to the accompanying drawing. This drawing presents a simple, schematic, elevational view of such a bed as it appears confined within a transparent-walled container, e.g. one made of plastic or glass.

In the bottom of the container 10 is shown the optional layer of water 2 which can serve as a back-up reservoir or supply of moisture. Floating on the layer of water 2 is a fluffy composite bed 3 of the type described above. Above the composite bed 3 is an air space 7, the degree of stillness or circulation in which can be readily adjusted by placing suitable loosely fitting or partial covers (not shown) on or over the upper rim of container 10. The composite bed 3 is made up of an intimate mixture of relatively coarse extender solid particles such as expanded mineral or mineral or organic aggregates (represented in the drawing by a multiplicity of small outlines 5 of varying size and shape) together with the very fine elements of the basic ingredient (represented in the drawing by a myriad of tiny black dots or specks 6). The composite bed 3 shown in the drawing is intended to be representative of one produced by mixing approximately equal bulk volumes of (a) an exfoliated vermiculite, most of the particles 5 of which were between about 5 mesh and about ¼ inch in medium dimension and (b) a basic ingredient, the elements 6 of which are essentially fine droplets of a dilute aqueous solution of plant nutrients surrounded by ultrafine hydrophobic particles of metal oxide, which was produced as indicated in the following example.

EXAMPLE 1

Preparing Basic Ingredient

Into a one-quart capacity Waring Blendor was placed 200 cc. of water containing dissolved therein about ¼ percent by weight of a complete plant food. To this was added 20 grams of a very fine, fluffy hydrophobic silica which had been made by reacting a pyrogenic silica (sold under the trade name of CAB-O-SIL) and having a specific BET surface area of about 250 square meters per gram with hexamethyldisilazane until about 5 percent by weight of —Si(CH$_3$)$_3$ surface groups were indicated to be present thereon (based upon infrared analysis). The dry fluffy silica remained suspended on the water occupying approximately another 400 cc. of the volume of the blender. After the cover was attached, the agitator was started. Rotation of the high-speed agitator pulled the fluffy silica into the liquid and simultaneously sheared the liquid into a fine dispersion. After only 10 seconds, the layer of aqueous liquid at the bottom had completely disappeared. When the Blendor was turned off, it appeared that it contained only the dry fluffy silica powder except that it now occupied approximately the portion (about two thirds) of the volume of the Blendor jar originally occupied by both liquid and dry solid. Microscopic examination of the finished product proved that it consisted of fine droplets of liquid stably enclosed and segregated from one another and a coating of dry hydrophobic silica particles. Although this finished product (referred to hereafter as Product 1-A) had seven times the bulk density of the original dry silica, it still flowed like a fine powder and looked outwardly much like the original dry silica except less dusty.

The above procedure was repeated except that increased amounts of the aqueous liquid were used with the same amount of the same hydrophobic silica. When 300 cc. of aqueous solution were used, the finished product appeared quite similar to Product 1-A above, and microscopic examination indicated that substantially all of the fine droplets of liquid were completely coated by fine silica particles. However, when 400 cc. of the solution were used, the finished product was slightly mushy in appearance and not quite so free flowing as the original dry silica powder. Close examination revealed the presence of a few droplets of liquid, which were not fully coated by dry powder particles but which were still held apart or trapped by the fully coated droplets.

EXAMPLE 2

Incorporating Supplemental Water in Basic Ingredient

One half (i.e. 110 grams) of Product 1-A made in Example 1 above was returned to the cleaned Waring Blendor together with 100 cc. of the same aqueous solution of plant food used in Example 1. The high-speed agitator was run for 5 seconds and then stopped. Observing a thin layer of liquid remaining at the bottom of the Blendor jar, it was run for 5 more seconds. Although no layer of liquid remained at this point, many small uncoated or incompletely coated liquid globules could be seen trapped within the interstices of the slightly slushy but still fluffy mass of finished material. This material is referred to hereinafter as Product 2.

EXAMPLE 3

Seed Germination

Seed beds about one-inch deep were formed in glass containers of equal size using Product 1-A in one and Product 2 in the other. Sparkie variety pea seeds were then gently placed in both beds using forceps to insert 25 individual seeds to about mid-depth in each bed in a regularly spaced pattern. The containers were loosely covered with watch glasses and placed side by side in a greenhouse zone of controlled temperature and light. Germination progress was checked daily and it was found that a high-germination efficiency (between 70 and 80 percent) was obtained in both cases. However, germination was noticeably faster in the seeds planted in the Product 2 bed. Thus, although the rootlets developed in each bed were exceptionally straight and strong looking, rootlets averaging about ½ to 1 inch in length took only 4 days to develop in Product 2 bed compared to 6 days in the bed of Product 1-A.

EXAMPLE 4

In this example, a hydrophobic colloidal sized alumina was used as the enveloping coating for the dispersed droplets of aqueous liquid. The particular alumina employed was a fumed (or pyrogenic) product commercially available under the trade name "ALON" (registered in the name of CABOT CORPORATION of Boston, Massachusetts). This material which has a bulk density of about 3 pounds per cubic foot, an average particle size of about 30 millimicrons and a specific surface area of about 100 square meters per gram was first rendered hydrophobic by treating it with 3.6 percent by weight of a silicone fluid sold under the trade name "L-31 Silicone Fluid" by Union Carbide Corporation. This material is a polysiloxane-type fluid with some residual, active silane groups in addition to many substituted methyl groups in its structure. Although it is believed that the reaction which occurs with the surface of the alumina particle involves mainly the active silane sites in the silicone fluid, there may also be some hydrogen bonding from some of the methyl groups.

Following the same method previously outlined in making Product 1-A in Example 1, 20 grams of this treated alumina was combined with 180 cc. of water containing about ¼ percent of soluble plant food in a one-quart Waring Blendor. Close examination of the resulting product showed it to be very similar to Product 1-A of Example 1, namely a loose bed of finely dispersed, individual liquid droplets each individually coated within an envelope of fine hydrophobic solid oxide particles. Accordingly, as would be expected, it was found to be suitable by itself or in mixtures with various water absorbent media, such as clay, dirt, sand, perlite and vermiculite, for use in germinating various vegetable or flower seeds and developing seedlings therefrom.

Many other variations and substitutions can be made in the above examples with the same or similar results. For example, wet precipitated metal oxides such as silicas, titanias, etcetera, can be used in place of the pyrogenic metal oxide products described above provided, of course, they are of the prescribed fineness of particle size and the surfaces thereof have been reacted to attach highly hydrophobic organic groupings extensively thereover.

As indicated in Examples 3 and 4, the products of this invention not only promote good germination of seeds but also permit exceptional freedom for rootlets to grow and penetrate extensively through the bed medium. However, perhaps the greatest benefit was seen at the time of transplanting the resultant seedlings when it was found that the entire root system was released easily with a minimum of breakage or damage thereto. Accordingly, provided care is used in placing the uprooted plants into their new growth medium, the started plants of such delicate species as phlox, petunia and geranium continue to grow and thrive with minimal setback due to the transplanting operation.

Having described our invention together with preferred embodiments thereof, what we claim and desire to secure by United States Letters Patent is:

1. A method of germinating seeds which comprises placing said seeds within a loose, pulverulent bed at least half of the bulk volume of which is contributed by a fluffy particulate material having the appearance and flow behavior of a relatively dry, voluminous powder but being actually composed of dispersed droplets of aqueous liquid averaging less than 100 microns in diameter and each enclosed within a coating network of smaller strongly hydrophobic, colloidal oxide particles, the mass of said aqueous liquid droplets being substantially greater than that of said colloidal oxide particles.

2. A method of germinating seeds as in claim 1 wherein the colloidal oxide particles have an average equivalent spherical diameter of less than about 100 millimicrons.

3. A method of germinating seeds as in claim 1 wherein the colloidal oxide particles have a specific surface area of at least 100 square meters per gram.

4. A method of germinating seeds as in claim 1 wherein the colloidal oxide particles have at least about 1 percent by weight of hydrophobic organo groups on the surface thereof and the total mass of said aqueous liquid droplets is at least five times as much as that of the colloidal oxide particles.

5. A method of germinating seeds as in claim 1 wherein said bed also contains a substantial portion of argillaceous solids intermixed with said fluffy particulate material.

6. A method of germinating seeds as in claim 1 wherein said bed also contains a substantial portion of aqueous liquid which is not enclosed within a coating network of hydrophobic, colloidal oxide particles.

7. A method of germinating seeds as in claim 1 wherein said aqueous liquid contains up to about 2 percent by weight of water-soluble plant nutrients dissolved therein.

8. A method of growing seedlings which comprises covering the roots of the seedlings with loose pulverulent matter at least half of the bulk volume of which is contributed by a fluffy particulate material having the appearance and flow behavior of a relatively dry, voluminous powder but actually composed of dispersed droplets of aqueous liquid averaging less than 100 microns in diameter and each enclosed within a coating network of smaller, strongly hydrophobic, colloidal oxide particles, the mass of said aqueous liquid droplets being substantially greater than that of said colloidal oxide particles.

9. A method of growing seedlings as in claim 8 wherein the colloidal oxide particles have an average equivalent spherical diameter of less than about 100 millimicrons.

10. A method of growing seedlings as in claim 8 wherein the colloidal oxide particles have a specific surface area of at least 100 square meters per gram.

11. A method of growing seedlings as in claim 8 wherein the colloidal oxide particles have at least about 1 percent by weight of hydrophobic organo groups on the surface thereof and the total mass of said aqueous liquid droplets is at least five times as much as that of the colloidal oxide particles.

12. A method of growing seedlings as in claim 8 wherein said loose pulverulent material includes a substantial portion of argillaceous solids intermixed with said fluffy particulate material.

13. A method of growing seedlings as in claim 8 wherein said loose pulverulent material includes a substantial portion of aqueous liquid which is not enclosed within a coating network of hydrophobic, colloidal oxide particles.

14. A method of growing seedlings as in claim 8 wherein said aqueous liquid contains up to 2 percent by weight of water-soluble plant nutrients dissolved therein.

* * * * *